US012645070B2

(12) United States Patent
Brunner et al.

(10) Patent No.: US 12,645,070 B2
(45) Date of Patent: Jun. 2, 2026

(54) ADMIXTURE SENSING METHOD FOR GIMBALED SCANNERS

(71) Applicant: Infineon Technologies AG, Neubiberg (DE)

(72) Inventors: David Brunner, Vienna (AT); Stephan Gerhard Albert, Munich (DE)

(73) Assignee: Infineon Technologies AG, Neubiberg (DE)

( * ) Notice: Subject to any disclaimer, the term of this patent is extended or adjusted under 35 U.S.C. 154(b) by 875 days.

(21) Appl. No.: 18/054,254

(22) Filed: Nov. 10, 2022

(65) Prior Publication Data

US 2024/0159877 A1 May 16, 2024

(51) Int. Cl.
*G02B 26/10* (2006.01)
*G01D 5/241* (2006.01)

(52) U.S. Cl.
CPC ........... *G02B 26/101* (2013.01); *G01D 5/241* (2013.01); *G01D 5/2417* (2013.01)

(58) Field of Classification Search
CPC ..... G02B 26/101; G01D 5/241; G01D 5/2417
See application file for complete search history.

(56) References Cited

U.S. PATENT DOCUMENTS

| | | | |
|---|---|---|---|
| 2012/0307211 A1* | 12/2012 | Hofmann | G02B 26/101 |
| | | | 353/31 |
| 2019/0235232 A1 | 8/2019 | Sekine et al. | |
| 2024/0288683 A1 | 8/2024 | Hofmann et al. | |

FOREIGN PATENT DOCUMENTS

| | | |
|---|---|---|
| DE | 102021116121 B3 | 10/2022 |
| JP | 2017207631 A | 11/2017 |

* cited by examiner

*Primary Examiner* — George G. King
(74) *Attorney, Agent, or Firm* — Harrity & Harrity, LLP

(57) ABSTRACT

A scanning system includes an oscillator structure configured to oscillate about an inner axis according to a first oscillation and oscillate about an outer axis according to a second oscillation; an inner frame mechanically coupled to the oscillator structure by a first support structure and a second support structure that extend along the inner axis; an outer frame mechanically coupled to the inner frame by a third support structure and a fourth support structure that extend along the outer axis; and an inner axis sensor positioned between the inner frame and the outer frame, wherein the inner axis sensor is configured to sense a first relative movement of the inner frame relative to the outer frame and generate a first sensor signal corresponding to the first relative movement, and wherein the first sensor signal is representative of a first angular position of the oscillator structure about the inner axis.

21 Claims, 6 Drawing Sheets

300

200

400

406

420

404

402

416

418

406

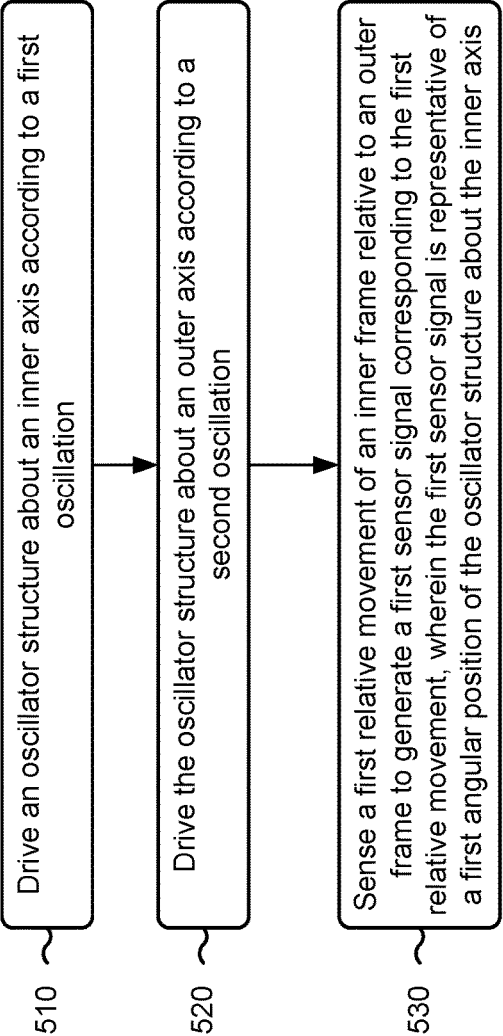

500

510    Drive an oscillator structure about an inner axis according to a first oscillation 520    Drive the oscillator structure about an outer axis according to a second oscillation 530    Sense a first relative movement of an inner frame relative to an outer frame to generate a first sensor signal corresponding to the first relative movement, wherein the first sensor signal is representative of a first angular position of the oscillator structure about the inner axis

FIG. 5

ADMIXTURE SENSING METHOD FOR GIMBALED SCANNERS

JOINT UNDERTAKING

The project leading to this application has received funding from the Electric Component Systems for European Leadership Joint Undertaking under grant agreement No. 826653. This Joint Undertaking receives support from the European Union's Horizons 2020 research and innovation program and Germany, Austria, Netherlands, France, Finland, Italy, Belgium, Czech Republic, Spain, Cyprus, Lithuania, and Turkey.

BACKGROUND

A scanning system may use two-dimensional scanning to scan one or more light beams within a field of view (FOV) according to a scanning pattern. The scanning system may use two scanning axes, including a first scanning axis that is configured to steer the one or more light beams in a first direction at a first scanning frequency and a second scanning axis that is configured to steer the one or more light beams in a second direction at a second scanning frequency. The second scanning axis is typically perpendicular to the first scanning axis. Microelectromechanical system (MEMS) scanning systems use precise and accurate feedback sensing in order to drive and correctly synchronize transmission timings of the light beams with a movement of a MEMS scanner, even under harsh conditions such as external vibrations or temperature variations. Additionally, synchronizing the first scanning frequency and the second scanning frequency is important to maintain a particular scanning pattern during a scanning operation.

SUMMARY

In some implementations, a scanning system includes an oscillator structure configured to oscillate about an inner axis according to a first oscillation and oscillate about an outer axis according to a second oscillation; an inner frame mechanically coupled to the oscillator structure by a first support structure and a second support structure, wherein the first support structure and the second support structure extend between the inner frame and the oscillator structure along the inner axis, and wherein the first support structure is arranged opposite to the second support structure relative to the oscillator structure; an outer frame mechanically coupled to the inner frame by a third support structure and a fourth support structure, wherein the third support structure and the fourth support structure extend between the inner frame and the outer frame along the outer axis, and wherein the third support structure is arranged opposite to the fourth support structure relative to the oscillator structure; and an inner axis sensor positioned between the inner frame and the outer frame, wherein the inner axis sensor is configured to sense a first relative movement of the inner frame relative to the outer frame and generate a first sensor signal corresponding to the first relative movement, wherein the first sensor signal is representative of a first angular position of the oscillator structure about the inner axis.

In some implementations, a system includes a rotating structure configured to rotate about an inner axis according to a first rotation and rotate about an outer axis according to a second rotation; an inner frame mechanically coupled to the rotating structure by a first support structure and a second support structure, wherein the first support structure and the second support structure extend between the inner frame and the rotating structure along the inner axis, and wherein the first support structure is arranged opposite to the second support structure relative to the rotating structure; an outer frame mechanically coupled to the inner frame by a third support structure and a fourth support structure, wherein the third support structure and the fourth support structure extend between the inner frame and the outer frame along the outer axis, and wherein the third support structure is arranged opposite to the fourth support structure relative to the rotating structure; and an inner axis sensor positioned between the inner frame and the outer frame, wherein the inner axis sensor is configured to sense a first relative movement of the inner frame relative to the outer frame and generate a first sensor signal corresponding to the first relative movement, wherein the first sensor signal is representative of a rotational position of the rotating structure about the inner axis.

In some implementations, a method includes driving an oscillator structure about an inner axis according to a first oscillation; driving the oscillator structure about an outer axis according to a second oscillation; and sensing a first relative movement of an inner frame relative to an outer frame to generate a first sensor signal corresponding to the first relative movement, wherein the first sensor signal is representative of a first angular position of the oscillator structure about the inner axis, wherein the inner frame is mechanically coupled to the oscillator structure by first support structures that extend along the inner axis, and wherein the outer frame is mechanically coupled to the inner frame by second support structures that extend along the outer axis.

BRIEF DESCRIPTION OF THE DRAWINGS

Implementations are described herein making reference to the appended drawings.

FIG. 5 is a flowchart of an example process associated with an admixture sensing method for gimbaled scanners.

DETAILED DESCRIPTION

Figure 1:
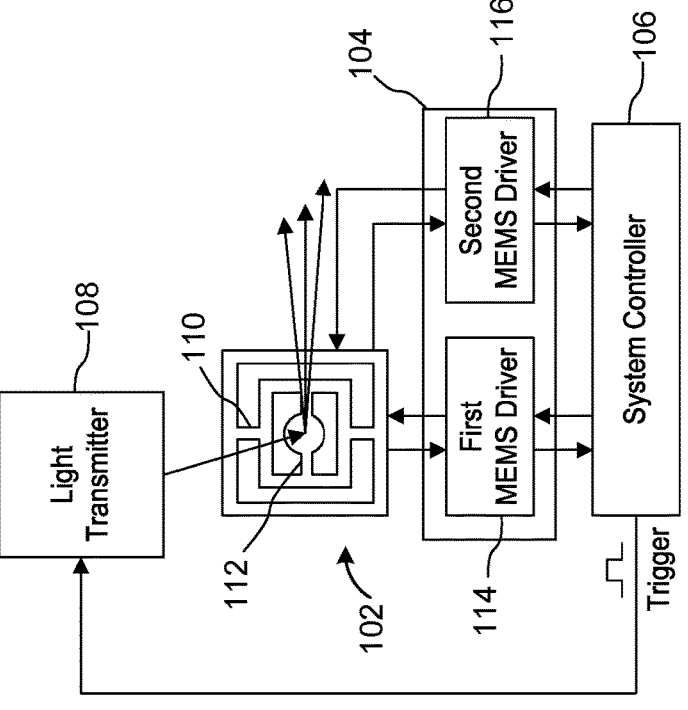
FIG. 1 is a schematic block diagram of a 2D scanning system according to one or more implementations.
Figure 1:
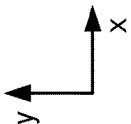
Figure 1:

In the following, details are set forth to provide a more thorough explanation of example implementations. However, it will be apparent to those skilled in the art that these implementations may be practiced without these specific details. In other instances, well-known structures and devices are shown in block diagram form or in a schematic view rather than in detail in order to avoid obscuring the implementations. In addition, features of the different implementations described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

In this regard, directional terminology, such as "top," "bottom," "below," "above," "front," "behind," "back," "leading," "trailing," etc., may be used with reference to an orientation of the figures being described. Because parts of the implementations, described herein, can be positioned in a number of different orientations, the directional terminology is used for purposes of illustration and is in no way limiting. It is to be understood that other implementations may be utilized and structural or logical changes may be made without departing from the scope defined by the claims. The following detailed description, therefore, is not to be taken in a limiting sense.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In implementations described herein or shown in the drawings, any direct electrical connection or coupling, e.g., any connection or coupling without additional intervening elements, may also be implemented by an indirect connection or coupling, e.g., a connection or coupling with one or more additional intervening elements, or vice versa, as long as the general purpose of the connection or coupling, for example, to transmit a certain kind of signal or to transmit a certain kind of information, is essentially maintained. Features from different implementations may be combined to form further implementations. For example, variations or modifications described with respect to one of the implementations may also be applicable to other implementations unless noted to the contrary.

The terms "substantially" and "approximately" may be used herein to account for small manufacturing tolerances or other factors (e.g., within 5%) that are deemed acceptable in the industry or without departing from the aspects of the implementations described herein. For example, a resistor with an approximate resistance value may practically have a resistance within 5% of the approximate resistance value.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

A single microelectromechanical system (MEMS) mirror can be driven about two or more scanning axes for use as a scanning device. A MEMS mirror that is driven about two scanning axes, for example, may be referred to as a two-dimensional (2D) MEMS mirror because the MEMS mirror can be steered in two dimensions using the two scanning axes. A MEMS mirror-based light beam scanner is one way to implement image projection technologies and object detection technologies, such as Light Detection and Ranging (LIDAR).

A gimbal design may be implemented for the 2D MEMS mirror due to its separation of both scanning axes. In the gimbal design, a mirror plate moves around or about an inner axis within a gimbal frame (e.g., an inner frame) supported by inner suspension structures. Additionally, the gimbal frame, the mirror plate, and the inner suspension structures rotate around or about an outer axis supported by outer suspension structures that are attached to a chip frame (e.g., an outer frame). The gimbal design effectively decouples both scanning directions.

For performing feedback sensing, an inner axis sensor is used to sense a rotational position of an inner axis movement about the inner axis and an outer axis sensor is used to sense a rotational position of an outer axis movement about the outer axis. Independent measurements of the movement about the inner axis and the movement about the outer axis may then be used as feedback information used to drive and correctly synchronize transmission timings of light beams with the movements of the 2D MEMS mirror and to synchronize a scanning frequency of the inner axis and a scanning frequency of the outer axis.

In order to drive a 2D MEMS mirror about the inner axis and to enable feedback sensing of the movement about the inner axis, wires have to be typically routed over the outer suspension structures, which can degrade the strength and reliability of the outer suspension structures and potentially lead to early failure. Hence, reducing a number of wires routed over the outer suspension structures to drive and sense the inner axis movement increases the design space and reliability of the 2D MEMS mirror.

In some implementations, an admixture of the gimbal frame that is solely related to an inner axis movement can be exploited in order to allow sensing of the inner axis movement. For example, the sensing of the inner axis movement may be based on a relative movement between the outer frame and the gimbal frame. Sensing the relative movement between the outer frame and the gimbal frame allows the inner axis sensor to be placed between the outer frame and the gimbal frame, as opposed to being placed between the gimbal frame and the mirror plate of the 2D MEMS mirror. The placement of the inner axis sensor between the outer frame and the gimbal frame reduces a number of wires routed over the outer suspension structures. For example, the wires used for sensing the inner axis movement (e.g., used for transmitting feedback information from the inner axis sensor to a measurement circuit) no longer need to be routed over the outer suspension structures due to the placement of the inner axis sensor between the outer frame and the gimbal frame. As a result, the number of wires routed over the outer suspension structures can be reduced and the strength and reliability of the outer suspension structures can be improved.

FIG. 1 is a schematic block diagram of a 2D scanning system 100 according to one or more implementations. In particular, the 2D scanning system 100 includes a microelectromechanical system (MEMS) mirror 102 implemented as a single scanning structure that is configured to steer or otherwise deflect light beams according to a 2D scanning pattern. The 2D scanning system 100 further includes a MEMS driver system 104, a system controller 106, and a light transmitter 108.

In the example shown in FIG. 1, the MEMS mirror 102 is a mechanical moving mirror (e.g., a MEMS micro-mirror) integrated on a semiconductor chip (not shown). The MEMS mirror 102 is configured to rotate or oscillate via rotation about two scanning axes that are typically orthogonal to each other. For example, the two scanning axes may include a first scanning axis 110 (e.g., an outer scanning axis) that enables the MEMS mirror 102 to steer light in a first scanning direction (e.g., an x-direction) and a second scanning axis 112 (e.g., an inner scanning axis) that enables the MEMS mirror 102 to steer light in a second scanning direction (e.g., a y-direction). As a result, the MEMS mirror 102 can direct light beams in two dimensions according to the 2D scanning pattern and may be referred to as a 2D MEMS mirror.

A scan can be performed to illuminate an area referred to as a field of view. The scan, such as an oscillating horizontal scan (e.g., from left to right and right to left of a field of view), an oscillating vertical scan (e.g., from bottom to top and top to bottom of a field of view), or a combination thereof (e.g., a Lissajous scan or a raster scan) can illuminate the field of view in a continuous scan fashion. In some implementations, the 2D scanning system 100 may be configured to transmit successive light beams, for example, as successive light pulses, in different scanning directions to scan the field of view. In some implementation, the 2D scanning system 100 may be configured to transmit a continuous light beam, for example, as a frequency-modulated continuous-wave (FMCW), in different scanning directions to scan the field of view. In other words, the field of view can be illuminated by a scanning operation. In general, an entire field of view represents a scanning area defined by a full range of motion of the MEMS mirror 102 at which the MEMS mirror 102 is driven. Thus, the entire field of view is delineated by a left edge, a right edge, a bottom edge, and a top edge. The entire field of view can also be referred to as a field of illumination or as a projection area in a projection plane onto which an image is projected.

The MEMS mirror 102 can direct a transmitted light beam at a desired 2D coordinate (e.g., an x-y coordinate) in the field of view. In some implementations, such as Light Detection and Ranging (LIDAR), the transmitted light beam may be backscattered by an object back towards the 2D scanning system 100 as a reflected light beam where the reflected light beam is detected by a sensor. For example, the sensor may be a photodetector array. The sensor may convert the reflected light beam into an electric signal, for example, a current signal or a voltage signal, that may be further processed by the 2D scanning system 100 to generate object data or an image. In such implementations, the desired 2D coordinate may correspond to a particular transmission direction in the field of view that is targeted by the transmitted light beam for object detection, with different 2D coordinates corresponding to different transmission directions. Alternatively, in some implementations, such as image projection systems, the desired 2D coordinate may correspond to an image pixel of a projected image, with different 2D coordinates corresponding to different image pixels of the projected image.

Accordingly, multiple light beams transmitted at different transmission times or a continuous light beam can be steered by the MEMS mirror 102 at the different 2D coordinates of the field of view in accordance with the 2D scanning pattern. The MEMS mirror 102 can be used to scan the field of view in both scanning directions by changing an angle of deflection of the MEMS mirror 102 on each of the first scanning axis 110 and the second scanning axis 112.

A rotation of the MEMS mirror 102 on the first scanning axis 110 may be performed between two predetermined extremum deflection angles (e.g., +/−5 degrees, +/−15 degrees, etc.). Likewise, a rotation of the MEMS mirror 102 on the second scanning axis 112 may be performed between two predetermined extremum deflection angles (e.g., +/−5 degrees, +/−15 degrees, etc.). In some implementations, depending on the 2D scanning pattern, the two predetermined extremum deflection angles used for the first scanning axis 110 may be the same as the two predetermined extremum deflection angles used for the second scanning axis 112. In some implementations, depending on the 2D scanning pattern, the two predetermined extremum deflection angles used for the first scanning axis 110 may be different from the two predetermined extremum deflection angles used for the second scanning axis 112.

In some implementations, the MEMS mirror 102 can be a resonator (e.g., a resonant MEMS mirror) configured to oscillate side-to-side about the first scanning axis 110 at a first frequency (e.g., a first resonance frequency) and configured to oscillate side-to-side about the second scanning axis 112 at a second frequency (e.g., a second resonance frequency). Thus, the MEMS mirror 102 can be continuously driven about the first scanning axis 110 and the second scanning axis 112 to perform a continuous scanning operation. As a result, light beams reflected by the MEMS mirror 102 are scanned into the field of view in accordance with the 2D scanning pattern.

Different frequencies or a same frequency may be used for the first scanning axis 110 and the second scanning axis 112 for defining the 2D scanning pattern. For example, a raster scanning pattern or a Lissajous scanning pattern may be achieved by using different frequencies for the first frequency and the second frequency. Raster scanning and Lissajous scanning are two types of scanning that can be implemented in display applications, light scanning applications, and light steering applications, to name a few. As an example, Lissajous scanning is typically performed using two resonant scanning axes which are driven at different constant scanning frequencies with a defined fixed frequency ratio therebetween that forms a specific Lissajous pattern and frame rate. In order to properly carry out the Lissajous scanning and the raster scanning, synchronization of the two scanning axes is performed by the system controller 106 in conjunction with transmission timings of the light transmitter 108.

For each respective scanning axis, including the first scanning axis 110 and the second scanning axis 112, the MEMS mirror 102 includes an actuator structure used to drive the MEMS mirror 102 about the respective scanning axis. Each actuator structure may include interdigitated finger electrodes made of interdigitated mirror combs and frame combs to which a drive voltage (e.g., an actuation signal or driving signal) is applied by the MEMS driver system 104. Applying a difference in electrical potential between interleaved mirror combs and frame combs creates a driving force between the mirror combs and the frame combs, which creates a torque on a mirror body of the MEMS mirror 102 about the intended scanning axis. The drive voltage can be toggled between two voltages, resulting in an oscillating driving force. The oscillating driving force causes the MEMS mirror 102 to oscillate back and forth on the respective scanning axis between two extrema. Depending on the configuration, this actuation can be regulated or adjusted by adjusting the drive voltage off time, a voltage level of the drive voltage, or a duty cycle.

In other examples, the MEMS mirror 102 may use other actuation methods to drive the MEMS mirror 102 about the respective scanning axes. For example, these other actuation methods may include electromagnetic actuation and/or piezoelectric actuators. In electromagnetic actuation, the MEMS mirror 102 may be immersed in a magnetic field. and an alternating electric current through conductive paths may create the oscillating torque around the scanning axis. Piezoelectric actuators may be integrated in leaf springs of the MEMS mirror 102, or the leaf springs may be made of piezoelectric material to produce alternating beam bending forces in response to an electrical signal to generate the oscillation torque.

The MEMS driver system 104 is configured to generate driving signals (e.g., actuation signals) to drive the MEMS mirror 102 about the first scanning axis 110 and the second scanning axis 112. In particular, the MEMS driver system 104 is configured to apply the driving signals to the actuator structure of the MEMS mirror 102. In some implementations, the MEMS driver system 104 includes a first MEMS driver 114 configured to drive the MEMS mirror 102 about the first scanning axis 110 and a second MEMS driver 116 configured to drive the MEMS mirror 102 about the second scanning axis 112. In implementations in which the MEMS mirror 102 is used as an oscillator, the first MEMS driver 114 configured to drive an oscillation of the MEMS mirror 102 about the first scanning axis 110 at the first frequency, and the second MEMS driver 116 is configured to drive an oscillation of the MEMS mirror 102 about the second scanning axis 112 at the second frequency.

The first MEMS driver 114 may be configured to sense an outer axis movement (e.g., a first rotational position) of the MEMS mirror 102 about the first scanning axis 110 using an outer axis sensor and provide first position information indicative of the first rotational position (e.g., tilt angle or degree of rotation about the first scanning axis 110) to the system controller 106. Similarly, the second MEMS driver 116 may be configured to sense an inner axis movement (e.g., a second rotational position) of the MEMS mirror 102 about the second scanning axis 112 using an inner axis sensor and provide second position information indicative of the second rotational position (e.g., tilt angle or degree of rotation about the second scanning axis 112) to the system controller 106.

The system controller 106 may use the first position information and the second position information to trigger light beams at the light transmitter 108. For example, the system controller 106 may use the first position information and the second position information to set a transmission time of light transmitter 108 in order to target a particular 2D coordinate of the 2D scanning pattern. Thus, a higher accuracy in position sensing of the MEMS mirror 102 by the first MEMS driver 114 and the second MEMS driver 116 may result in the system controller 106 providing more accurate and precise control of other components of the 2D scanning system 100.

As noted above, the first MEMS driver 114 and the second MEMS driver 116 may apply a drive voltage to a corresponding actuator structure of the MEMS mirror 102 as the driving signal to drive a rotation (e.g., an oscillation) of the MEMS mirror 102 about a respective scanning axis (e.g., the first scanning axis 110 or the second scanning axis 112). The drive voltage can be switched or toggled between a high-voltage (HV) level and a low-voltage (LV) level resulting in an oscillating driving force. In some implementations, the LV level may be zero (e.g., the drive voltage is off), but is not limited thereto and could be a non-zero value. When the drive voltage is toggled between an HV level and an LV level and the LV level is set to zero, it can be said that the drive voltage is toggled on and off (HV on/off). The oscillating driving force causes the MEMS mirror 102 to oscillate back and forth on the first scanning axis 110 or the second scanning axis 112 between two extrema. The drive voltage may be a constant drive voltage, meaning that the drive voltage is the same voltage when actuated (e.g., toggled on) or one or both of the HV level or the LV level of the drive voltage may be adjustable. However, it will be understood that the drive voltage is being toggled between the HV level and the LV level in order to produce the mirror oscillation. Depending on a configuration, this actuation can be regulated or adjusted by the system controller 106 by adjusting the drive voltage off time, a voltage level of the drive voltage, or a duty cycle. As noted above, frequency and phase of the drive voltage can also be regulated and adjusted.

In some implementations, the system controller 106 is configured to set a driving frequency of the MEMS mirror 102 for each scanning axis and is capable of synchronizing the oscillations about the first scanning axis 110 and the second scanning axis 112. In particular, the system controller 106 may be configured to control an actuation of the MEMS mirror 102 about each scanning axis by controlling the driving signals. The system controller 106 may control the frequency, the phase, the duty cycle, the HV level, and/or the LV level of the driving signals to control the actuations about the first scanning axis 110 and the second scanning axis 112. The actuation of the MEMS mirror 102 about a particular scanning axis controls its range of motion and scanning rate about that particular scanning axis.

For example, to make a Lissajous scanning pattern reproduce itself periodically with a frame rate frequency, the first frequency at which the MEMS mirror 102 is driven about the first scanning axis 110 and the second frequency at which the MEMS mirror 102 is driven about the second scanning axis 112 are different. A difference between the first frequency and the second frequency is set by a fixed frequency ratio that is used by the 2D scanning system 100 to form a repeatable Lissajous pattern (frame) with a frame rate. A new frame begins each time the Lissajous scanning pattern restarts, which may occur when a phase difference between a mirror phase about the first scanning axis 110 and a mirror phase about the second scanning axis 112 is zero. The system controller 106 may set the fixed frequency ratio and synchronize the oscillations about the first scanning axis 110 and the second scanning axis 112 to ensure this fixed frequency ratio is maintained based on the first position information and the second position information received from the first MEMS driver 114 and the second MEMS driver 116, respectively.

The light transmitter may include one or more light sources, such as one or more laser diodes or one or more light emitting diodes, for generating one or more light beams. In some implementations, the light transmitter 108 may be configured to sequentially transmit a plurality of light beams (e.g., light pulses) as the MEMS mirror 102 changes its transmission direction in order to target different 2D coordinates. The plurality of light beams may include visible light, infrared (IR) light, or other types of illumination signals, depending on an application of the 2D scanning system 100. A transmission sequence of the plurality of light beams and a timing thereof may be implemented by the light transmitter 108 according to a trigger signal received from the system controller 106. Alternatively, in some implementations, the light transmitter 108 may be configured to transmit a continuous light beam as the MEMS mirror 102 changes its transmission direction in order to target different 2D coordinates. The continuous light beam may include visible light, IR light, or another type of illumination signal, depending on the application of the 2D scanning system 100.

The system controller 106 is configured to control components of the 2D scanning system 100. In certain applications, the system controller 106 may also be configured to receive programming information with respect to the 2D scanning pattern and control a timing of the plurality of light beams generated by the light transmitter 108 based on the programming information. Thus, the system controller 106 may include both processing and control circuitry that is configured to generate control signals for controlling the light transmitter 108, the first MEMS driver 114, and the second MEMS driver 116.

In some implementations, the system controller 106 is configured to use independent measurements of the outer axis movement about the first scanning axis 110 and the inner axis movement about the second scanning axis 112 used to drive and correctly synchronize transmission timings of the plurality of light beams with the movements of the MEMS mirror 102 and to synchronize a first scanning frequency of the first scanning axis 110 and a second scanning frequency of the second scanning axis 112. For example, the system controller 106 may be configured to set the driving frequencies of the MEMS mirror 102 for the first scanning axis 110 and the second scanning axis 112 and may be capable of synchronizing the oscillations about the first scanning axis 110 and the second scanning axis 112 to generate the 2D scanning pattern. In some implementations, in which the plurality of light beams is used, the system controller 106 may be configured to generate the trigger signal used for triggering the light transmitter 108 to generate the plurality of light beams. Using the trigger signal, the system controller 106 can control the transmission times of the plurality of light beams of the light transmitter 108 to achieve a desired illumination pattern within the field of view. The desired illumination pattern is produced by a combination of the 2D scanning pattern produced by the MEMS mirror 102 and the transmission times triggered by the system controller 106. In some implementations in which the continuous light beam is used, the system controller 106 may be configured to control a frequency modulation of the continuous light beam via a control signal provided to the light transmitter 108.

As indicated above, FIG. 1 is provided merely as an example. Other examples are possible and may differ from what was described with regard to FIG. 1. In practice, the 2D scanning system 100 may include additional components, fewer components, different components, or differently arranged components than those shown in FIG. 1 without deviating from the disclosure provided above. In addition, in some implementations, the 2D scanning system 100 may include one or more additional 2D MEMS mirrors or one or more additional light transmitters used to scan one or more additional field of views. Additionally, two or more components shown in FIG. 1 may be implemented within a single component, or a single component shown in FIG. 1 may be implemented as multiple, distributed components.

Additionally, or alternatively, a set of components (e.g., one or more components) of the 2D scanning system 100 may perform one or more functions described as being performed by another set of components of the 2D scanning system 100.

Figure 2:
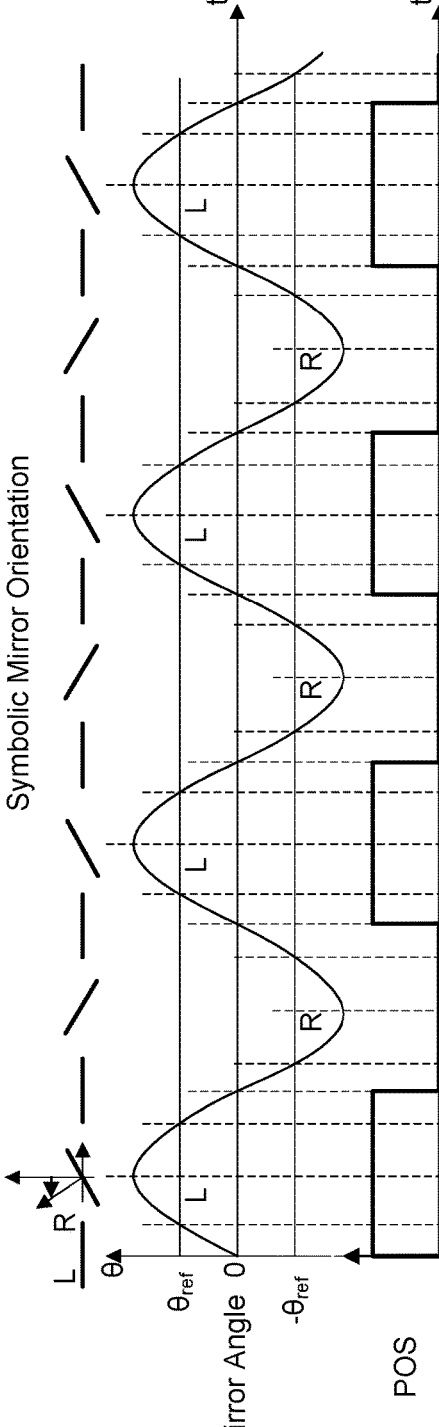
FIG. 2 is a signal diagram of a position signal generated by a 2D scanning system based on a mirror angle according to one or more implementations.

FIG. 2 is a signal diagram 200 of a position signal POS generated by a 2D scanning system based on a mirror angle θ according to one or more implementations. FIG. 2 illustrates the position signal POS relative to a symbolic mirror orientation of a MEMS mirror and relative to a mirror angle trajectory of the mirror angle θ of the MEMS mirror. A positive reference angle θref and a negative reference angle −θref are used as reference angles for the mirror angle trajectory, where a positive mirror angle corresponds to the MEMS mirror tilting in a left (L) direction and a negative mirror angle corresponds to the MEMS mirror tilting in a right (R) direction.

The MEMS driver system 104 described in FIG. 1 may generate the position signal POS for each of the scanning axes, including the first scanning axis 110 and the second scanning axis 112. For example, the first MEMS driver 114 may perform position sensing to monitor a mirror position (e.g., the mirror angle θ) about the first scanning axis 110 and generate the position signal POS corresponding to an angular trajectory about the first scanning axis 110. Similarly, the second MEMS driver 116 may perform position sensing to monitor a mirror position (e.g., the mirror angle θ) about the second scanning axis 112 and generate the position signal POS corresponding to an angular trajectory about for the second scanning axis 112. Thus, while only one position signal POS is shown in FIG. 2, it will be appreciated that the MEMS driver system 104 may generate two position signals, with each position signal POS corresponding to one of first scanning axis 110 or the second scanning axis 112.

In some implementations, the position signal POS may be square wave having a first signal transition (e.g., falling-edge transition) that is triggered at a zero-crossing as a MEMS mirror oscillates in a first rotational direction (e.g., a clockwise direction) and having a second signal transition (e.g., rising-edge transition) that is triggered at a zero-crossing as the mirror oscillates in a second rotational direction (e.g., a counter-clockwise direction). Furthermore, the position signal POS is "high" when the MEMS mirror points in one direction (e.g., points left), and the signal is "low" when the mirror points in a second direction (e.g., points right). Thus, the position signal POS not only indicates a zero-crossing event by triggering a signal transition, but also indicates absolute phase information by indicating a tilt direction of the MEMS mirror and/or a direction in which the MEMS mirror is moving of the. As intervals between zero-crossing events increase, a frequency of the position signal POS decreases. Conversely, as the intervals between zero-crossing events increase, the frequency of the position signal POS increases. Thus, the position signal POS is also representative of a frequency of the MEMS mirror about a respective scanning axis.

Alternatively, in some implementations, the position signal POS may be a pulsed signal including short signal pulses. For example, a short pulse may be generated at each zero-crossing event. In other words, the position signal POS remains low (or high) between the signal pulses. In this case, the absolute phase information indicating the direction the mirror is moving is absent.

In some implementations, the first MEMS driver 114 may receive a measurement signal to continuously sense a rotational position (e.g., angular position) about the first scanning axis 110 and generate the position signal POS for the first scanning axis 110 that is indicative of detected zero-crossing events. For example, first MEMS driver 114 may detect zero-crossing events at which a value of the measurement signal is detected to be equal to a predefined value that corresponds to a zero rotation angle about the first scanning axis 110, and generate the position signal POS that indicates each of the detected zero-crossing events corresponding to the first scanning axis 110.

Similarly, the second MEMS driver 116 may receive a measurement signal to continuously sense a rotational position about the second scanning axis 112 and generate the position signal POS for the second scanning axis 112 that is indicative of detected zero-crossing events. For example, second MEMS driver 116 may detect zero-crossing events at which a value of the measurement signal is detected to be equal to a predefined value that corresponds to a zero rotational angle about the second scanning axis 112 and generate the position signal POS that indicates each of the detected zero-crossing events corresponding to the second scanning axis 112.

In some implementations, the measurement signals used by the first MEMS driver 114 and the second MEMS driver 116 may be obtained in the following manner. As a MEMS mirror rotates, a capacitance of the actuation structure (e.g., a capacitance between interdigitated finger electrodes) may change according to the rotational position of the MEMS mirror. The first MEMS driver 114 and the second MEMS driver 116 may be configured to measure the capacitance of the actuation structure of a respective scanning axis (e.g., the first scanning axis 110 or the second scanning axis 112) and determine the rotational position therefrom. For example, as the MEMS mirror 102 moves about the first scanning axis 110, a geometry of the actuator structure corresponding to the first scanning axis 110 changes, resulting in a change in a geometry of the capacitance. As the geometry of the capacitance changes, the capacitance itself changes. Thus, a specific capacitance may correspond directly with a specific rotational position (e.g., a specific tilt angle) of the MEMS mirror 102 about the first scanning axis 110. As an example, one way to measure the capacitance is to measure a current flowing through the actuation structure, convert the current into a voltage, and then further correlate the voltage to a capacitance and/or the rotational position. However, any method to measure the capacitance may be used. A rotational direction (e.g., positive or negative, left-to-right or right-to-left, clockwise or counter-clockwise, etc.) is also detected by measuring a change in capacitance over time, where a positive or a negative change indicates opposing rotational directions.

Accordingly, the first MEMS driver 114 may be configured to sense the capacitance of the actuation structure corresponding to the first scanning axis 110 in order to monitor and track the angular trajectory of the MEMS mirror 102 about the first scanning axis 110 and determine a specific rotational position of the MEMS mirror 102 about the first scanning axis 110, including the zero-crossings. The second MEMS driver 116 may similarly sense the capacitance of the actuation structure corresponding to the second scanning axis 112 in order to monitor and track the angular trajectory of the MEMS mirror 102 about the second scanning axis 112 and determine a specific rotational position of the MEMS mirror 102 about the second scanning axis 112, including the zero-crossings.

The MEMS driver system 104 may be configured to transmit the position signal POS for each scanning axis to the system controller 106 as position information. Based on the position signal POS a phase and/or a frequency of two or more position signals POS can be compared by the system controller 106 for synchronizing oscillations about the first scanning axis 110 and the second scanning axis 112. For, example, based on the position signal POS of the first scanning axis 110, the system controller 106 may obtain at least one of phase information or frequency information of the MEMS mirror 102 about the first scanning axis 110. Similarly, based on the position signal POS of the second scanning axis 112, the system controller 106 may obtain at least one of phase information or frequency information of the MEMS mirror 102 about the second scanning axis 112. The system controller 106 may use the phase information, the frequency information, or both the phase information and the frequency information for synchronizing the oscillations about the first scanning axis 110 and the second scanning axis 112.

In addition, in some implementations, system controller 106 may use the position information to control the triggering of the light beams. The position information may also be used by the system controller 106 as feedback information such that the system controller 106 can maintain a stable operation of one or more MEMS mirrors via control signals provided to the MEMS driver system 104. The position information may also be used by the system controller 106 as feedback information such that the system controller 106 can maintain synchronization between the two or more scanning axes, including the first scanning axis 110 and the second scanning axis 112. The position information may also be used by the system controller 106 to achieve a fast Lissajous lock between two oscillations at start-up of a 2D scanner system, thus speeding up the time until the 2D scanner system is ready for transmitting the light beams.

As indicated above, FIG. 2 is provided merely as an example. Other examples are possible and may differ from what was described with regard to FIG. 2. In practice, the position signal POS may be any signal capable of indicating position information, including at least one of phase information, frequency information, or zero-crossing information. Accordingly, a waveform of the position signal POS may differ from the one shown in FIG. 2.

Figure 3:
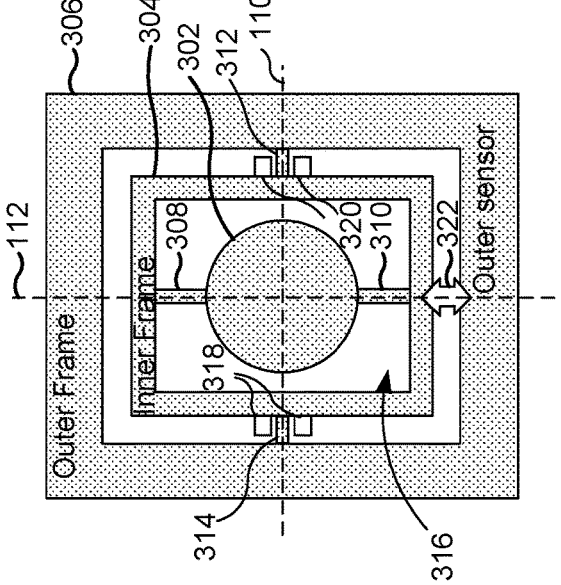
FIG. 3 illustrates a top view of a MEMS mirror according to one or more implementations.

FIG. 3 illustrates a top view of a MEMS mirror 300 according to one or more implementations. The MEMS mirror 300 is similar to the MEMS mirror 102 described above in conjunction with FIG. 1, having an inner axis (e.g., the second scanning axis 112) and an outer axis (e.g., the first scanning axis 110). The MEMS mirror 300 includes an oscillator structure 302 (e.g., a mirror plate or mirror body), an inner frame 304 (e.g., a gimbal frame), and an outer frame 306 (e.g., a chip frame). The oscillator structure 302 is configured to oscillate about the first scanning axis 110 (e.g., the outer axis) according to a first oscillation and oscillate about the second scanning axis 112 (e.g., the inner axis) according to a second oscillation.

The inner frame 304 is mechanically coupled to the oscillator structure 302 by inner suspension structures, such as a first support structure 308 and a second support structure 310. The first support structure 308 and the second support structure 310 extend between the inner frame 304 and the oscillator structure 302 along the second scanning axis 112 (e.g., the inner axis). In addition, the first support structure 308 is arranged opposite to the second support structure 310 relative to the oscillator structure 302.

The outer frame 306 is mechanically coupled to the inner frame 304 by outer suspension structures, including a third support structure 312 and a fourth support structure 314. The third support structure 312 and the fourth support structure 314 extend between the inner frame 304 and the outer frame 306 along the first scanning axis 110 (e.g., the outer axis). In addition, the third support structure 312 is arranged opposite to the fourth support structure 314 relative to the oscillator structure 302. Accordingly, the inner frame 304 encircles the oscillator structure 302 and the outer frame 306 encircles the inner frame 304 and the oscillator structure 302.

The first support structure 308 and the second support structure 310 suspend the oscillator structure 302 over a cavity 316 to enable the second oscillation. The third support structure 312 and the fourth support structure 314 suspend the oscillator structure 302 over the cavity 316 to enable the first oscillation. The cavity 316 provides sufficient free space to permit a first range of motion of the oscillator structure 302 about the first scanning axis 110 and a second range of motion of the oscillator structure 302 about the second scanning axis 112.

In some implementations, the oscillator structure 302, the inner frame 304, the outer frame 306, the first support structure 308, the second support structure 310, the third support structure 312, and the fourth support structure 314 may be formed from a single semiconductor substrate of a semiconductor chip. Accordingly, the oscillator structure 302, the inner frame 304, the outer frame 306, the first support structure 308, the second support structure 310, the third support structure 312, and the fourth support structure 314 may form a one-piece integral member that is formed from the semiconductor substrate. As a result, the outer frame 306 may be referred to as a chip frame of the semiconductor chip that is rotationally fixed. A reflective film, reflective coating, or reflective substrate may be applied to the semiconductor substrate of the oscillator structure 302 to form a mirror.

The MEMS mirror 300 further includes a first inner axis sensor 318 that is positioned between the inner frame 304 and the outer frame 306. The first inner axis sensor 318 is configured to sense a first relative movement of the inner frame 304 relative to the outer frame 306 and generate a first sensor signal corresponding to the first relative movement. The first relative movement corresponds to the inner axis movement of the oscillator structure 302 (e.g., the rotation of the oscillator structure 302 about the second scanning axis 112). Accordingly, the first sensor signal is representative of a first angular position of the oscillator structure 302 about the second scanning axis 112 (e.g., the inner axis) and is substantially independent of the outer axis movement of the oscillator structure 302 about the first scanning axis 110 (e.g., the outer axis). More particularly, the first sensor signal is substantially independent of the outer axis movement of the oscillator structure 302 about the first scanning axis 110 (e.g., the outer axis), as well as any movement of the first support structure 308, the second support structure 310, and the inner frame 304 about the first scanning axis 110. The second MEMS driver 116 may receive the first sensor signal from the first inner axis sensor 318 and use the first sensor signal to generate a position signal POS for the second scanning axis 112, as described above in conjunction with FIG. 2.

The inner frame 304 and the outer frame 306 are structured such that the second oscillation of the oscillator structure 302 about the second scanning axis 112 causes the inner frame 304 to oscillate via an admixture effect relative to the outer frame 306 in a region of the first inner axis sensor 318. Accordingly, the oscillation of the inner frame 304 relative to the outer frame 306 can be used as a measurement of the second oscillation of the oscillator structure 302 that is substantially independent of the outer axis movement of the oscillator structure 302 about the first scanning axis 110 when the first inner axis sensor 318 is placed proximate to the first scanning axis 110 (e.g., proximate to the fourth support structure 314). By placing the first inner axis sensor 118 close to the first scanning axis 110, a sensor cross-coupling between the first scanning axis 110 and the second scanning axis 112 can be minimized.

For example, the outer axis movement of the oscillator structure 302 is most pronounced and, therefore, most detectable along the second scanning axis 112 and the outer axis movement of the oscillator structure 302 is least pronounced and, therefore, least detectable along the first scanning axis 110. On the other hand, the inner axis movement of the oscillator structure 302 is most pronounced and, therefore, most detectable along the first scanning axis 110 and is least pronounced and, therefore, least detectable along the second scanning axis 112. Accordingly, the first inner axis sensor 318 may be arranged proximate to the first scanning axis 110 and the fourth support structure 314 and distant from the second scanning axis 112 as to not be influenced by the outer axis movement and to maximize the first sensor signal. In other words, the first inner axis sensor 318 may be arranged proximate to the first scanning axis 110 such that the first inner axis sensor 318 is arranged closer to the first scanning axis 110 than to the second scanning axis 112.

In some implementations, the first inner axis sensor 318 may include two sensor components that are symmetrically arranged about the first scanning axis 110. In some implementations, the first inner axis sensor 318 may be coupled to the inner frame 304 and to the outer frame 306. In some implementations, the first inner axis sensor 318 may be a capacitive sensor having a capacitance that is configured to change based on the first relative movement of the inner frame 304 relative to the outer frame 306. As a result, the first sensor signal is a measure of the capacitance of the first inner axis sensor 318. For example, the first inner axis sensor 318 may include fixed electrostatic combs and movable electrostatic combs that are interleaved with the fixed electrostatic combs. The fixed electrostatic combs may be part of the outer frame 306 and the movable electrostatic combs may be part of the inner frame 304. The movable electrostatic combs are configured to move relative to the fixed electrostatic combs as the inner frame 304 moves relative to the outer frame 306, thereby changing a geometry of the capacitance of the first inner axis sensor 318. The first inner axis sensor 118 is placed close to the first scanning axis 110 and far from the second scanning axis 112 to increase the relative movement of the movable electrostatic combs relative to the fixed electrostatic combs. As the geometry of the capacitance changes, the capacitance of the first inner axis sensor 318 itself changes. Thus, a specific capacitance of the first inner axis sensor 318 may correspond directly with a specific rotational position (e.g., a specific tilt angle) of the MEMS mirror 300 about the second scanning axis 112 (e.g., the inner axis). The first inner axis sensor 318 may output a displacement current as the first sensor signal that is representative of the capacitance of the first inner axis sensor 318 and therefore representative of the first angular position of the oscillator structure 302 about the second scanning axis 112 (e.g., the inner axis).

The first sensor signal may be received and used by the second MEMS driver 116 to generate the position signal POS for the second scanning axis 112, as described above in conjunction with FIG. 2. For example, the second MEMS driver 116 may include a sensor circuit that is configured to receive the first sensor signal and determine the first angular position of the oscillator structure 302 about the second scanning axis 112 based on first sensor signal. Alternatively, or additionally, the sensor circuit of the second MEMS driver 116 may be configured to receive the first sensor signal and measure an angular trajectory of the oscillator structure 302 about the second scanning axis 112. The second MEMS driver 116 may provide position information (e.g., the position signal POS for the second scanning axis 112) to the system controller 106 for use in synchronizing the transmission times with the inner axis movement as well as for synchronizing a frequency and/or phase of the first oscillation about the first scanning axis 110 with the second oscillation about the second scanning axis 112.

Sensing the first relative movement between the outer frame 306 and the inner frame 304 allows the first inner axis sensor 318 to be placed between the outer frame 306 and the inner frame 304, as opposed to being placed between the inner frame 304 and the oscillator structure 302. The placement of the first inner axis sensor 318 between the outer frame 306 and the inner frame 304 reduces a number of wires routed over the third support structure 312 and the fourth support structure 314 (e.g., the outer suspension structures). For example, wires used for sensing the inner axis movement (e.g., used for transmitting feedback information from the first inner axis sensor 318 to a measurement circuit) no longer need to be routed over the outer suspension structures due to the placement of the first inner axis sensor 318 between the outer frame 306 and the inner frame 304. As a result, the number of wires routed over the outer suspension structures can be reduced and the strength and reliability of the outer suspension structures can be improved.

In addition, removing the wires used for sensing the inner axis movement eliminates electrical cross-talk between sensing signals and driving signals routed over the outer suspension structures that may be present if the wires used for sensing the inner axis movement were routed over the outer suspension structures. Eliminating the electrical cross-talk between the sensing signals and the driving signals results in more accurate sensing signals and driving signals because the sensing signals and the driving signals no longer influence each other that can lead to signal errors.

In some implementations, the MEMS mirror 300 may include a second inner axis sensor 320 that is positioned between the inner frame 304 and the outer frame 306. The second inner axis sensor 320 is configured to sense the first relative movement of the inner frame 304 relative to the outer frame 306 and generate a second sensor signal corresponding to the first relative movement. For example, the inner frame 304 and the outer frame 306 are structured such that the second oscillation of the oscillator structure 302 about the second scanning axis 112 causes the inner frame 304 to oscillate via an admixture effect relative to the outer frame 306 in a region of the second inner axis sensor 320. Accordingly, the oscillation of the inner frame 304 relative to the outer frame 306 can be used as a measurement of the second oscillation of the oscillator structure 302 that is substantially independent of the outer axis movement of the oscillator structure 302 about the first scanning axis 110 when the second inner axis sensor 320 is placed proximate to the first scanning axis 110 (e.g., proximate to the third support structure 312). In some implementations, the second inner axis sensor 320 may include two sensor components that are symmetrically arranged about the first scanning axis 110. In some implementations, the second inner axis sensor 320 may be coupled to the inner frame 304 and to the outer frame 306. In some implementations, similar to the first inner axis sensor 318, the second inner axis sensor 320 may be a capacitive sensor having a capacitance that is configured to change based on the first relative movement of the inner frame 304 relative to the outer frame 306.

Sensing the first relative movement between the outer frame 306 and the inner frame 304 allows the second inner axis sensor 320 to be placed between the outer frame 306 and the inner frame 304, as opposed to being placed between the inner frame 304 and the oscillator structure 302. The placement of the second inner axis sensor 320 between the outer frame 306 and the inner frame 304 reduces a number of wires routed over the third support structure 312 and the fourth support structure 314 (e.g., the outer suspension structures). For example, wires used for sensing the inner axis movement (e.g., used for transmitting feedback information from the second inner axis sensor 320 to a measurement circuit) no longer need to be routed over the outer suspension structures due to the placement of the second inner axis sensor 320 between the outer frame 306 and the inner frame 304. As a result, the number of wires routed over the outer suspension structures can be reduced and the strength and reliability of the outer suspension structures can be improved.

In addition, removing the wires used for sensing the inner axis movement eliminates electrical cross-talk between sensing signals and driving signals routed over the outer suspension structures that may be present if the wires used for sensing the inner axis movement were routed over the outer suspension structures. Eliminating the electrical cross-talk between the sensing signals and the driving signals results in more accurate sensing signals and driving signals because the sensing signals and the driving signals no longer influence each other that can lead to signal errors.

The second MEMS driver 116 may combine the second sensor signal with the first sensor signal generated by the first inner axis sensor 318 to generate the position signal POS for the second scanning axis 112, as described above in conjunction with FIG. 2. For example, the second MEMS driver 116 may generate a sum, a difference, or an average of the first sensor signal and the second sensor signal for generating the position signal POS for the second scanning axis 112. Using a combination of the first sensor signal and the second sensor signal may provide a more robust and more accurate measurement of the inner axis movement of the oscillator structure 302 (e.g., of the first angular position of the oscillator structure).

The MEMS mirror 300 further includes an outer axis sensor 322 positioned between the inner frame 304 and the outer frame 306. The outer axis sensor 322 is configured to sense a second relative movement of the inner frame 304 relative to the outer frame 306 and generate a third sensor signal corresponding to the second relative movement of the inner frame 304 relative to the outer frame 306. The second relative movement of the inner frame 304 relative to the outer frame 306 corresponds to the outer axis movement of the oscillator structure 302 (e.g., the rotation of the oscillator structure 302 about the first scanning axis 110). Accordingly, the third sensor signal is representative of a second angular position of the oscillator structure 302 about the first scanning axis 110 (e.g., the outer axis) and is substantially independent of the inner axis movement of the oscillator structure 302 about the second scanning axis 112 (e.g., the inner axis). In general, the outer axis sensor 322 can be placed anywhere between the inner frame 304 and the outer frame 306, but should be symmetric about the second scanning axis 112 so as to minimize any influence of the admixture effect, which may corrupt the measurement of the second relative movement. The first MEMS driver 114 may receive the third sensor signal from the outer axis sensor 322 and use the third sensor signal to generate a position signal POS for the first scanning axis 110, as described above in conjunction with FIG. 2.

In some implementations, the outer axis sensor 322 may be a capacitive sensor having a capacitance that is configured to change based on the second relative movement of the inner frame 304 relative to the outer frame 306. As a result, the third sensor signal is a measure of the capacitance of the outer axis sensor 322. For example, the outer axis sensor 322 may include fixed electrostatic combs and movable electrostatic combs that are interleaved with the fixed electrostatic combs. The fixed electrostatic combs may be part of the outer frame 306 and the movable electrostatic combs may be part of the inner frame 304. The movable electrostatic combs are configured move relative to the fixed electrostatic combs as the inner frame 304 moves relative to the outer frame 306, thereby changing a geometry of the capacitance of the outer axis sensor 322. As the geometry of the capacitance changes, the capacitance of the outer axis sensor 322 itself changes. Thus, a specific capacitance of the outer axis sensor 322 may correspond directly with a specific rotational position (e.g., a specific tilt angle) of the MEMS mirror 300 about the first scanning axis 110 (e.g., the outer axis). The outer axis sensor 322 may output a displacement current as the third sensor signal that is representative of the capacitance of the outer axis sensor 322 and therefore representative of the second angular position of the oscillator structure 302 about the first scanning axis 110 (e.g., the outer axis).

The third sensor signal may be received and used by the first MEMS driver 114 to generate the position signal POS for the first scanning axis 110, as described above in conjunction with FIG. 2. For example, the first MEMS driver 114 may include a sensor circuit that is configured to receive the third sensor signal and determine the second angular position of the oscillator structure 302 about the first scanning axis 110 based on third sensor signal. Alternatively, or additionally, the sensor circuit of the first MEMS driver 114 may be configured to receive the third sensor signal and measure an angular trajectory of the oscillator structure 302 about the first scanning axis 110. The first MEMS driver 114 may provide position information (e.g., the position signal POS for the first scanning axis 110) to the system controller 106 for use in synchronizing the transmission times with the outer axis movement as well as for synchronizing a frequency and/or phase of the first oscillation about the first scanning axis 110 with the second oscillation about the second scanning axis 112.

As indicated above, FIG. 3 is provided merely as an example. Other examples are possible and may differ from what was described with regard to FIG. 3. In practice, the MEMS mirror 300 may include additional components, fewer components, different components, or differently arranged components than those shown in FIG. 3 without deviating from the disclosure provided above. Additionally, two or more components shown in FIG. 3 may be implemented within a single component, or a single component shown in FIG. 3 may be implemented as multiple, distributed components. Additionally, or alternatively, a set of components (e.g., one or more components) of the MEMS mirror 300 may perform one or more functions described as being performed by another set of components of the MEMS mirror 300.

Figure 4A:
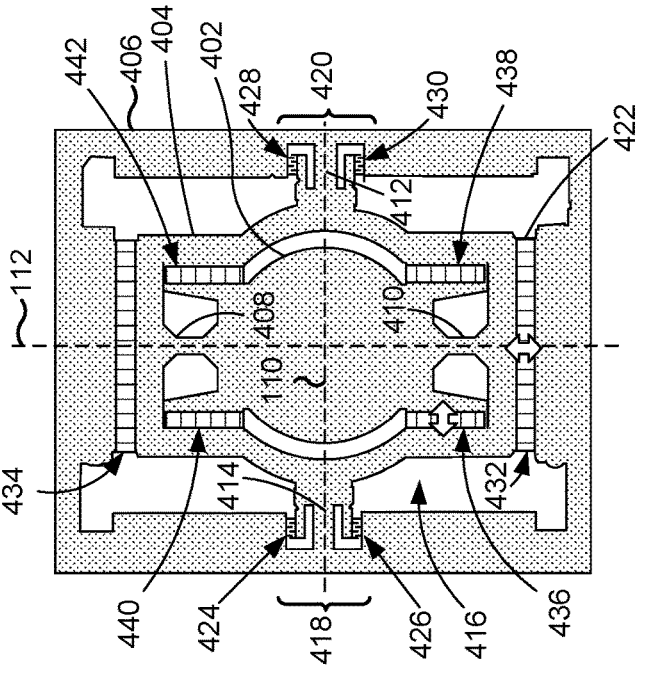
FIG. 4A illustrates a top view of a MEMS mirror according to one or more implementations.
Figure 4B:
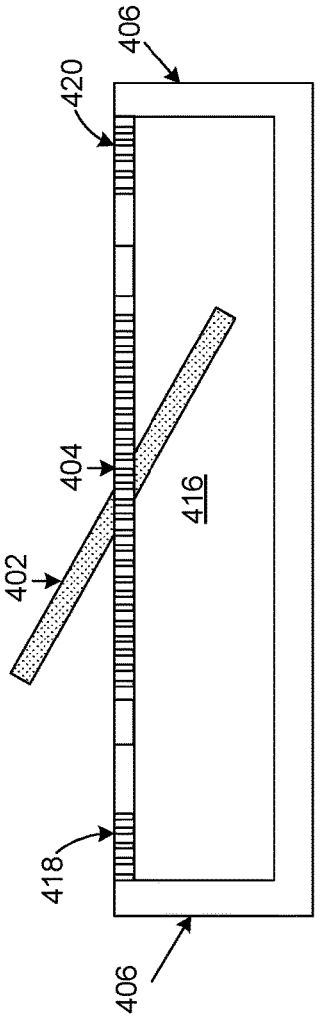
FIG. 4B illustrates a side view of the MEMS mirror shown in FIG. 4A according to one or more implementations.

FIG. 4A illustrates a top view of a MEMS mirror 400 according to one or more implementations. FIG. 4B illustrates a side view of the MEMS mirror 400 according to one 65 or more implementations. The side view is taken parallel to the first scanning axis 110.

The MEMS mirror 400 is similar to the MEMS mirror 300 described above in conjunction with FIG. 3, having an inner axis (e.g., the second scanning axis 112) and an outer axis (e.g., the first scanning axis 110). Similar to the MEMS mirror 300, the MEMS mirror 400 includes an oscillator structure 402 (e.g., a mirror plate or mirror body), an inner frame 404 (e.g., a gimbal frame), and an outer frame 406 (e.g., a chip frame), a first support structure 408, a second support structure 410, a third support structure 412, and a fourth support structure 414. The oscillator structure 402 is configured to oscillate about the first scanning axis 110 (e.g., the outer axis) according to a first oscillation and oscillate about the second scanning axis 112 (e.g., the inner axis) according to a second oscillation. The first support structure 408, the second support structure 410, the third support structure 412, and the fourth support structure 414 are used as suspensions to suspend the oscillator structure 402 over a cavity 416.

The MEMS mirror 400 includes a first inner axis sensor 418, a second inner axis sensor 420, and an outer axis sensor 422. In some implementations, the first inner axis sensor 418, the second inner axis sensor 420, and the outer axis sensor 422 use one or more pairs of interdigitated finger electrodes made of interdigitated moving combs and fixed combs for sensing inner axis movement or outer axis movement. As described above, a capacitance between the interdigitated finger electrodes of a sensor may be used to measure the inner axis movement and the outer axis movement.

For example, the first inner axis sensor 418 may include a first pair of interdigitated finger electrodes 424 made of interdigitated moving combs coupled to the inner frame 404 and fixed combs coupled to the outer frame 406, and a second pair of interdigitated finger electrodes 426 made of interdigitated moving combs coupled to the inner frame 404 and fixed combs coupled to the outer frame 406. The first pair of interdigitated finger electrodes 424 and the second pair of interdigitated finger electrodes 426 are arranged proximate to the first scanning axis 110. In addition, the first pair of interdigitated finger electrodes 424 and the second pair of interdigitated finger electrodes 426 are symmetrically arranged about the first scanning axis 110. The interdigitated moving combs of the first pair of interdigitated finger electrodes 424 and the interdigitated moving combs of the second pair of interdigitated finger electrodes 426 may be coupled to the inner frame 404 via mechanical arms that extend from a main body of the inner frame 404. Thus, the mechanical arms co-rotate with the inner frame 404. In some implementations, the mechanical arms may extend parallel to the fourth support structure 414.

The first inner axis sensor 418 generates a first sensor signal based on a capacitance formed by the first pair of interdigitated finger electrodes 424 and a capacitance formed by the second pair of interdigitated finger electrodes 426. Thus, the first inner axis sensor 418 is configured to sense a first relative movement of the inner frame 404 relative to the outer frame 406 and generate the first sensor signal corresponding to the first relative movement. The first relative movement corresponds to the inner axis movement of the oscillator structure 402 (e.g., the rotation of the oscillator structure 402 about the second scanning axis 112).

The second inner axis sensor 420 may include a third pair of interdigitated finger electrodes 428 made of interdigitated moving combs coupled to the inner frame 404 and fixed combs coupled to the outer frame 406, and a fourth pair of interdigitated finger electrodes 430 made of interdigitated moving combs coupled to the inner frame 404 and fixed combs coupled to the outer frame 406. The third pair of interdigitated finger electrodes 428 and the fourth pair of interdigitated finger electrodes 430 are arranged proximate to the first scanning axis 110. In addition, the f third pair of interdigitated finger electrodes 428 and the fourth pair of interdigitated finger electrodes 430 are symmetrically arranged about the first scanning axis 110. The interdigitated moving combs of the third pair of interdigitated finger electrodes 428 and the interdigitated moving combs of the fourth pair of interdigitated finger electrodes 430 may be coupled to the inner frame 404 via mechanical arms that extend from a main body of the inner frame 404. Thus, the mechanical arms co-rotate with the inner frame 404. In some implementations, the mechanical arms may extend parallel to the third support structure 412.

The second inner axis sensor 420 generates a second sensor signal based on a capacitance formed by the third pair of interdigitated finger electrodes 428 and the fourth pair of interdigitated finger electrodes 430. Thus, the second inner axis sensor 420 is configured to sense the first relative movement of the inner frame 404 relative to the outer frame 406 and generate the second sensor signal corresponding to the first relative movement. The first relative movement corresponds to the inner axis movement of the oscillator structure 402 (e.g., the rotation of the oscillator structure 402 about the second scanning axis 112).

The outer axis sensor 422 may include a fifth pair of interdigitated finger electrodes 432 made of interdigitated moving combs coupled to the inner frame 404 and fixed combs coupled to the outer frame 406. The fifth pair of interdigitated finger electrodes 432 may also be part of an actuation structure that drives a first oscillation of the oscillation structure 402 about the first scanning axis 110 (e.g., the outer axis). For example, driving signals and feedback signals may be both based on capacitance changes between the fifth pair of interdigitated finger electrodes 432. The fifth pair of interdigitated finger electrodes 432 are arranged symmetrically about the second scanning axis 112. In some implementations, as shown in FIG. 4A, the fifth pair of interdigitated finger electrodes 432 may extend from one side of the second scanning axis 112, laterally across the second scanning axis 112, to another side of the second scanning axis 112. In some implementations, the outer axis sensor 422 may include two pairs of interdigitated finger electrodes that are arranged symmetrically about the second scanning axis 112.

The MEMS mirror 400 may include a sixth pair of interdigitated finger electrodes 434 made of interdigitated moving combs coupled to the inner frame 404 and fixed combs coupled to the outer frame 406. The sixth pair of interdigitated finger electrodes 434 may form an actuation structure that drives the first oscillation of the oscillation structure 402 about the first scanning axis 110 (e.g., the outer axis). In some implementations, the sixth pair of interdigitated finger electrodes 434 may be used as an additional outer axis sensor. For example, driving signals and feedback signals may be both based on capacitance changes between the sixth pair of interdigitated finger electrodes 434. The sixth pair of interdigitated finger electrodes 434 are arranged symmetrically about the second scanning axis 112. In some implementations, as shown in FIG. 4A, the sixth pair of interdigitated finger electrodes 434 may extend from one side of the second scanning axis 112, laterally across the second scanning axis 112, to another side of the second scanning axis 112. In some implementations, the sixth pair of interdigitated finger electrodes 434 may be divided into two or more pairs of interdigitated finger electrodes that are arranged symmetrically about the second scanning axis 112.

The MEMS mirror 400 further includes actuation structures that drive the second oscillation of the oscillation structure 402 about the second scanning axis 112 (e.g., the inner axis). For example, the MEMS mirror 400 may include a seventh pair of interdigitated finger electrodes 436 made of interdigitated moving combs coupled to the inner frame 404 and fixed combs coupled to the outer frame 406, a eighth pair of interdigitated finger electrodes 438 made of interdigitated moving combs coupled to the inner frame 404 and fixed combs coupled to the outer frame 406, a ninth pair of interdigitated finger electrodes 440 made of interdigitated moving combs coupled to the inner frame 404 and fixed combs coupled to the outer frame 406, and a tenth pair of interdigitated finger electrodes 442 made of interdigitated moving combs coupled to the inner frame 404 and fixed combs coupled to the outer frame 406.

The seventh pair of interdigitated finger electrodes 436 and the eighth pair of interdigitated finger electrodes 438 are arranged symmetrically about the second scanning axis 112. The ninth pair of interdigitated finger electrodes 440 and the tenth pair of interdigitated finger electrodes 442 are arranged symmetrically about the second scanning axis 112. The seventh pair of interdigitated finger electrodes 436 and the ninth pair of interdigitated finger electrodes 440 are arranged symmetrically about the first scanning axis 110. The eighth pair of interdigitated finger electrodes 438 and the tenth pair of interdigitated finger electrodes 442 are arranged symmetrically about the first scanning axis 110.

The seventh pair of interdigitated finger electrodes 436, the eighth pair of interdigitated finger electrodes 438, the ninth pair of interdigitated finger electrodes 440, and tenth pair of interdigitated finger electrodes 442 are configured to receive driving signals to drive the second oscillation of the oscillation structure 402 about the second scanning axis 112 based on capacitance changes induced by the driving signals.

As indicated above, FIGS. 4A and 4B are provided merely as examples. Other examples are possible and may differ from what was described with regard to FIGS. 4A and 4B. In practice, the MEMS mirror 400 may include additional components, fewer components, different components, or differently arranged components than those shown in FIGS. 4A and 4B without deviating from the disclosure provided above. Additionally, two or more components shown in FIGS. 4A and 4B may be implemented within a single component, or a single component shown in FIGS. 4A and 4B may be implemented as multiple, distributed components. Additionally, or alternatively, a set of components (e.g., one or more components) of the MEMS mirror 400 may perform one or more functions described as being performed by another set of components of the MEMS mirror 400.

FIG. 5 is a flowchart of an example process 500 associated with an admixture sensing method for gimbaled scanners. In some implementations, one or more process blocks of FIG. 5 are performed by a 2D scanning system (e.g., 2D scanning system 100). In some implementations, one or more process blocks of FIG. 5 are performed by a MEMS mirror (e.g., MEMS mirror 102, MEMS mirror 300, or MEMS mirror 400). In some implementations, one or more process blocks of FIG. 5 are performed another device or a group of devices separate from or including the MEMS mirror, such as a MEMS driver system (e.g., MEMS driver system 104) and/or a system controller (e.g., system controller 106). Additionally, or alternatively, one or more process blocks of FIG. 5 may be performed by one or more components of the MEMS mirror, such as a first inner axis sensor (e.g., first inner axis sensor 318), a second inner axis sensor (e.g., second inner axis sensor 320), and/or an outer axis sensor (e.g., outer axis sensor 322).

As shown in FIG. 5, process 500 may include driving an oscillator structure about an inner axis according to a first oscillation (block 510). For example, the MEMS driver system 104 may drive the oscillator structure about an inner axis according to a first oscillation, as described above.

As further shown in FIG. 5, process 500 may include driving the oscillator structure about an outer axis according to a second oscillation (block 520). For example, the MEMS driver system 104 may drive the oscillator structure about an outer axis according to a second oscillation, as described above.

As further shown in FIG. 5, process 500 may include sensing a first relative movement of an inner frame relative to an outer frame to generate a first sensor signal corresponding to the first relative movement, wherein the first sensor signal is representative of a first angular position of the oscillator structure about the inner axis, wherein the inner frame is mechanically coupled to the oscillator structure by first support structures that extend along the inner axis, and wherein the outer frame is mechanically coupled to the inner frame by second support structures that extend along the outer axis (block 530). For example, the first inner axis sensor 318 and/or the second inner axis sensor 320 may sense a first relative movement of an inner frame relative to an outer frame to generate a first sensor signal corresponding to the first relative movement, wherein the first sensor signal is representative of a first angular position of the oscillator structure about the inner axis, as described above. In some implementations, the inner frame is mechanically coupled to the oscillator structure by first support structures that extend along the inner axis. In some implementations, the outer frame is mechanically coupled to the inner frame by second support structures that extend along the outer axis.

Process 500 may include additional implementations, such as any single implementation or any combination of implementations described below and/or in connection with one or more other processes described elsewhere herein.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The following provides an overview of some Aspects of the present disclosure:

Aspect 1: A scanning system, comprising: an oscillator structure configured to oscillate about an inner axis according to a first oscillation and oscillate about an outer axis according to a second oscillation; an inner frame mechanically coupled to the oscillator structure by a first support structure and a second support structure, wherein the first support structure and the second support structure extend between the inner frame and the oscillator structure along the inner axis, and wherein the first support structure is arranged opposite to the second support structure relative to the oscillator structure; an outer frame mechanically coupled to the inner frame by a third support structure and a fourth support structure, wherein the third support structure and the fourth support structure extend between the inner frame and the outer frame along the outer axis, and wherein the third support structure is arranged opposite to the fourth support structure relative to the oscillator structure; and an inner axis sensor positioned between the inner frame and the outer frame, wherein the inner axis sensor is configured to sense a first relative movement of the inner frame relative to the outer frame and generate a first sensor signal corresponding to the first relative movement, wherein the first sensor signal is representative of a first angular position of the oscillator structure about the inner axis.

Aspect 2: The scanning system of Aspect 1, wherein the inner frame and the outer frame are structured such that the first oscillation causes the inner frame to oscillate relative to the outer frame in a region of the inner axis sensor.

Aspect 3: The scanning system of any of Aspects 1-2, wherein the inner axis sensor is arranged proximate to the outer axis such that the inner axis sensor is arranged closer to the outer axis than to the inner axis.

Aspect 4: The scanning system of any of Aspects 1-3, wherein the inner axis sensor is a capacitive sensor having a capacitance that is configured to change based on the first relative movement, wherein the first sensor signal is a measure of the capacitance.

Aspect 5: The scanning system of Aspect 4, wherein the capacitive sensor comprises fixed electrostatic combs and movable electrostatic combs that are interleaved with the fixed electrostatic combs, wherein the movable electrostatic combs are configured to move relative to the fixed electrostatic combs based on the first relative movement to cause the capacitance to change.

Aspect 6: The scanning system of any of Aspects 1-5, further comprising: an outer axis sensor positioned between the inner frame and the outer frame, wherein the outer axis sensor is configured to sense a second relative movement of the inner frame relative to the outer frame and generate a second sensor signal corresponding to the second relative movement, wherein the second sensor signal is representative of a second angular position of the oscillator structure about the outer axis. wherein the second sensor signal is representative of a second angular position of the oscillator structure about the outer axis.

Aspect 7: The scanning system of Aspect 6, wherein the outer axis sensor is arranged symmetric about the inner axis.

Aspect 8: The scanning system of Aspect 6, wherein the outer axis sensor is a capacitive sensor having a capacitance that is configured to change based on the second relative movement, wherein the second sensor signal is a measure of the capacitance.

Aspect 9: The scanning system of Aspect 8, wherein the capacitive sensor comprises fixed electrostatic combs and movable electrostatic combs that are interleaved with the fixed electrostatic combs, wherein the movable electrostatic combs are configured to move relative to the fixed electrostatic combs based on the second relative movement to cause the capacitance to change.

Aspect 10: The scanning system of any of Aspects 1-9, further comprising: a sensor circuit configured to receive the first sensor signal and determine the first angular position of the oscillator structure about the inner axis based on first sensor signal.

Aspect 11: The scanning system of any of Aspects 1-10, further comprising: a sensor circuit configured to receive the first sensor signal and measure an angular trajectory of the oscillator structure about the inner axis.

Aspect 12: The scanning system of any of Aspects 1-11, wherein: the first support structure and the second support structure are configured to suspend the oscillator structure over a cavity to enable the first oscillation, and the third support structure and the fourth support structure are configured to suspend the inner frame over the cavity to enable the second oscillation.

Aspect 13: The scanning system of any of Aspects 1-12, wherein the inner frame encircles the oscillator structure and the outer frame encircles the inner frame and the oscillator structure.

Aspect 14: The scanning system of any of Aspects 1-13, wherein the inner frame is a gimbal frame and the outer frame is a chip frame of a semiconductor chip.

Aspect 15: The scanning system of any of Aspects 1-14, wherein the oscillator structure, the inner frame, and the outer frame form a one-piece integral member.

Aspect 16: The scanning system of any of Aspects 1-15, wherein the inner axis sensor is coupled to the inner frame and the outer frame.

Aspect 17: A system, comprising: a rotating structure configured to rotate about an inner axis according to a first rotation and rotate about an outer axis according to a second rotation; an inner frame mechanically coupled to the rotating structure by a first support structure and a second support structure, wherein the first support structure and the second support structure extend between the inner frame and the rotating structure along the inner axis, and wherein the first support structure is arranged opposite to the second support structure relative to the rotating structure; an outer frame mechanically coupled to the inner frame by a third support structure and a fourth support structure, wherein the third support structure and the fourth support structure extend between the inner frame and the outer frame along the outer axis, and wherein the third support structure is arranged opposite to the fourth support structure relative to the rotating structure; and an inner axis sensor positioned between the inner frame and the outer frame, wherein the inner axis sensor is configured to sense a first relative movement of the inner frame relative to the outer frame and generate a first sensor signal corresponding to the first relative movement, wherein the first sensor signal is representative of a rotational position of the rotating structure about the inner axis.

Aspect 18: The system of Aspect 17, wherein the inner frame and the outer frame are structured such that the first rotation causes the inner frame to move relative to the outer frame in a region of the inner axis sensor.

Aspect 19: The system of any of Aspects 17-18, wherein the inner axis sensor is arranged adjacent to at least one of the third support structure or the fourth support structure.

Aspect 20: The system of any of Aspects 17-19, wherein the inner axis sensor is a capacitive sensor having a capacitance that is configured to change based on the first relative movement, wherein the first sensor signal is a measure of the capacitance.

Aspect 21: A method, comprising: driving an oscillator structure about an inner axis according to a first oscillation; driving the oscillator structure about an outer axis according to a second oscillation; and sensing a first relative movement of an inner frame relative to an outer frame to generate a first sensor signal corresponding to the first relative movement, wherein the first sensor signal is representative of a first angular position of the oscillator structure about the inner axis, wherein the inner frame is mechanically coupled to the oscillator structure by first support structures that extend along the inner axis, and wherein the outer frame is mechanically coupled to the inner frame by second support structures that extend along the outer axis.

Aspect 22: A system configured to perform one or more operations recited in one or more of Aspects 1-21.

Aspect 23: An apparatus comprising means for performing one or more operations recited in one or more of Aspects 1-21.

Aspect 24: A non-transitory computer-readable medium storing a set of instructions, the set of instructions comprising one or more instructions that, when executed by a device, cause the device to perform one or more operations recited in one or more of Aspects 1-21.

Aspect 25: A computer program product comprising instructions or code for executing one or more operations recited in one or more of Aspects 1-21.

The foregoing disclosure provides illustration and description, but is not intended to be exhaustive or to limit the implementations to the precise form disclosed. Modifications and variations are possible in light of the above disclosure or may be acquired from practice of the implementations.

For example, although implementations described herein relate to MEMS devices with a mirror, it is to be understood that other implementations may include optical devices other than MEMS mirror devices or other MEMS oscillating structures. In addition, although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer, or an electronic circuit.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some implementations a single act may include or may be broken into multiple sub acts. Such sub acts may be included and part of the disclosure of this single act unless explicitly excluded.

Instructions may be executed by one or more processors, such as one or more central processing units (CPU), digital signal processors (DSPs), general purpose microprocessors, application specific integrated circuits (ASICs), field programmable logic arrays (FPLAs), or other equivalent integrated or discrete logic circuitry. Accordingly, the term "processor" or "processing circuitry" as used herein refers to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

Thus, the techniques described in this disclosure may be implemented, at least in part, in hardware, software executing on hardware, firmware, or any combination thereof. For example, various aspects of the described techniques may be implemented within one or more processors, including one or more microprocessors, DSPs, ASICs, or any other equivalent integrated or discrete logic circuitry, as well as any combinations of such components.

A controller including hardware may also perform one or more of the techniques described in this disclosure. Such hardware, software, and firmware may be implemented within the same device or within separate devices to support the various techniques described in this disclosure. Software may be stored on a non-transitory computer-readable medium such that the non-transitory computer readable medium includes a program code or a program algorithm stored thereon which, when executed, causes the controller, via a computer program, to perform the steps of a method.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A scanning system, comprising:
an oscillator structure configured to oscillate about an inner axis according to a first oscillation and oscillate about an outer axis according to a second oscillation;
an inner frame mechanically coupled to the oscillator structure by a first support structure and a second support structure, wherein the first support structure and the second support structure extend between the inner frame and the oscillator structure along the inner axis, and wherein the first support structure is arranged opposite to the second support structure relative to the oscillator structure;
an outer frame mechanically coupled to the inner frame by a third support structure and a fourth support structure, wherein the third support structure and the fourth support structure extend between the inner frame and the outer frame along the outer axis, and wherein the third support structure is arranged opposite to the fourth support structure relative to the oscillator structure; and
an inner axis sensor positioned between the inner frame and the outer frame, wherein the inner axis sensor is configured to sense a first relative movement of the inner frame relative to the outer frame and generate a first sensor signal corresponding to the first relative movement,
wherein the first sensor signal is representative of a first angular position of the oscillator structure about the inner axis.

2. The scanning system of claim 1, wherein the inner frame and the outer frame are structured such that the first oscillation causes the inner frame to oscillate relative to the outer frame in a region of the inner axis sensor.

3. The scanning system of claim 1, wherein the inner axis sensor is arranged proximate to the outer axis such that the inner axis sensor is arranged closer to the outer axis than to the inner axis.

4. The scanning system of claim 1, wherein the inner axis sensor is a capacitive sensor having a capacitance that is configured to change based on the first relative movement, wherein the first sensor signal is a measure of the capacitance.

5. The scanning system of claim 4, wherein the capacitive sensor comprises fixed electrostatic combs and movable electrostatic combs that are interleaved with the fixed electrostatic combs, wherein the movable electrostatic combs are configured to move relative to the fixed electrostatic combs based on the first relative movement to cause the capacitance to change.

6. The scanning system of claim 1, further comprising:
an outer axis sensor positioned between the inner frame and the outer frame, wherein the outer axis sensor is configured to sense a second relative movement of the inner frame relative to the outer frame and generate a second sensor signal corresponding to the second relative movement,
wherein the second sensor signal is representative of a second angular position of the oscillator structure about the outer axis.

7. The scanning system of claim 6, wherein the outer axis sensor is arranged symmetric about the inner axis.

8. The scanning system of claim 6, wherein the outer axis sensor is a capacitive sensor having a capacitance that is configured to change based on the second relative movement, wherein the second sensor signal is a measure of the capacitance.

9. The scanning system of claim 8, wherein the capacitive sensor comprises fixed electrostatic combs and movable electrostatic combs that are interleaved with the fixed electrostatic combs, wherein the movable electrostatic combs are configured to move relative to the fixed electrostatic combs based on the second relative movement to cause the capacitance to change.

10. The scanning system of claim 1, further comprising:
a sensor circuit configured to receive the first sensor signal and determine the first angular position of the oscillator structure about the inner axis based on first sensor signal.

11. The scanning system of claim 1, further comprising:
a sensor circuit configured to receive the first sensor signal and measure an angular trajectory of the oscillator structure about the inner axis.

12. The scanning system of claim 1, wherein:

the first support structure and the second support structure are configured to suspend the oscillator structure over a cavity to enable the first oscillation, and the third support structure and the fourth support structure are configured to suspend the inner frame over the cavity to enable the second oscillation.

13. The scanning system of claim 1, wherein the inner frame encircles the oscillator structure and the outer frame encircles the inner frame and the oscillator structure.

14. The scanning system of claim 1, wherein the inner frame is a gimbal frame and the outer frame is a chip frame of a semiconductor chip.

15. The scanning system of claim 1, wherein the oscillator structure, the inner frame, and the outer frame form a one-piece integral member.

16. The scanning system of claim 1, wherein the inner axis sensor is coupled to the inner frame and the outer frame.

17. A system, comprising:

a rotating structure configured to rotate about an inner axis according to a first rotation and rotate about an outer axis according to a second rotation;

an inner frame mechanically coupled to the rotating structure by a first support structure and a second support structure, wherein the first support structure and the second support structure extend between the inner frame and the rotating structure along the inner axis, and wherein the first support structure is arranged opposite to the second support structure relative to the rotating structure;

an outer frame mechanically coupled to the inner frame by a third support structure and a fourth support structure, wherein the third support structure and the fourth support structure extend between the inner frame and the outer frame along the outer axis, and wherein the third support structure is arranged opposite to the fourth support structure relative to the rotating structure; and an inner axis sensor positioned between the inner frame and the outer frame, wherein the inner axis sensor is configured to sense a first relative movement of the inner frame relative to the outer frame and generate a first sensor signal corresponding to the first relative movement, wherein the first sensor signal is representative of a rotational position of the rotating structure about the inner axis.

18. The system of claim 17, wherein the inner frame and the outer frame are structured such that the first rotation causes the inner frame to move relative to the outer frame in a region of the inner axis sensor.

19. The system of claim 17, wherein the inner axis sensor is arranged adjacent to at least one of the third support structure or the fourth support structure.

20. The system of claim 17, wherein the inner axis sensor is a capacitive sensor having a capacitance that is configured to change based on the first relative movement, wherein the first sensor signal is a measure of the capacitance.

21. A method, comprising:

driving an oscillator structure about an inner axis according to a first oscillation;

driving the oscillator structure about an outer axis according to a second oscillation; and sensing a first relative movement of an inner frame relative to an outer frame to generate a first sensor signal corresponding to the first relative movement, wherein the first sensor signal is representative of a first angular position of the oscillator structure about the inner axis, wherein the inner frame is mechanically coupled to the oscillator structure by first support structures that extend along the inner axis, and wherein the outer frame is mechanically coupled to the inner frame by second support structures that extend along the outer axis.

* * * * *